(12) United States Patent
Kuwana et al.

(10) Patent No.: US 8,009,264 B2
(45) Date of Patent: Aug. 30, 2011

(54) COMPOSITION FOR PHOTO-ALIGNMENT FILM, PHOTO-ALIGNMENT FILM, AND OPTICALLY ANISOTROPIC MEDIUM

(75) Inventors: Yasuhiro Kuwana, Kitaadachi-gun (JP); Isa Nishiyama, Kitaadachi-gun (JP); Kazuaki Hatsusaka, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 232 days.

(21) Appl. No.: 12/440,074

(22) PCT Filed: Nov. 1, 2007

(86) PCT No.: PCT/JP2007/071315
§ 371 (c)(1),
(2), (4) Date: Mar. 5, 2009

(87) PCT Pub. No.: WO2008/056597
PCT Pub. Date: May 15, 2008

(65) Prior Publication Data
US 2010/0189930 A1 Jul. 29, 2010

(30) Foreign Application Priority Data
Nov. 8, 2006 (JP) ................................. 2006-302727

(51) Int. Cl.
*G02B 5/30* (2006.01)
*G02F 1/00* (2006.01)
*G03F 1/00* (2006.01)
*C09K 19/00* (2006.01)
*C08L 33/00* (2006.01)
*C08L 25/00* (2006.01)
*C08L 39/00* (2006.01)

(52) U.S. Cl. ............. 349/182; 349/183; 428/1.2; 430/7; 430/20; 522/62; 522/116; 525/293; 525/201; 525/203; 525/212; 525/227

(58) Field of Classification Search ................ 522/62, 522/116, 136; 428/1.2, 1.55, 1.33; 430/7, 430/20; 525/201, 203, 212, 217, 227, 293
See application file for complete search history.

(56) References Cited

U.S. PATENT DOCUMENTS

| | | | |
|---|---|---|---|
| 6,582,776 B2 | 6/2003 | Yip et al. | |
| 7,074,344 B2 * | 7/2006 | Nakata et al. | 252/299.4 |
| 7,425,394 B2 * | 9/2008 | Sawatari et al. | 430/20 |
| 2007/0160778 A1 * | 7/2007 | Matsumori et al. | 428/1.2 |
| 2007/0254220 A1 * | 11/2007 | Kondo et al. | 430/20 |
| 2009/0269513 A1 * | 10/2009 | Nishiyama et al. | 428/1.2 |

FOREIGN PATENT DOCUMENTS

| | | |
|---|---|---|
| JP | 05-215921 A | 8/1993 |
| JP | 2001-089657 A | 4/2001 |
| JP | 2002-250924 A | 9/2002 |
| JP | 2005-173548 A | 6/2005 |
| WO | WO-2006/003893 A1 | 1/2006 |

* cited by examiner

*Primary Examiner* — Susan W Berman
(74) *Attorney, Agent, or Firm* — Edwards Angell Palmer & Dodge LLP; James E. Armstrong, IV; Junko Harada

(57) ABSTRACT

According to a composition for a photo-alignment film of the present invention, which includes an azo compound and a polymer that exhibits mutual solubility with the azo compound, an adhesion to a substrate, particularly to a plastic substrate, is improved within both a photo-alignment film having a haze of not more than 1 obtained by forming a layer of the above composition for a photo-alignment film on a substrate and subsequently irradiating the layer with light to generate a liquid crystal alignment ability; and an optically anisotropic medium, wherein a layer (A) obtained by irradiating a layer of the above composition for a photo-alignment film with light to generate a liquid crystal alignment ability, and a polymer layer (B) obtained by polymerizing a liquid crystal compound having a polymerizable group in an aligned state generated by the layer (A) are bonded and laminated together by covalent bonds.

8 Claims, No Drawings

COMPOSITION FOR PHOTO-ALIGNMENT FILM, PHOTO-ALIGNMENT FILM, AND OPTICALLY ANISOTROPIC MEDIUM

CROSS-REFERENCE TO PRIOR APPLICATION

This is the U.S. National Phase Application under 35 U.S.C. §371 of International Patent Application No. PCT/JP2007/071315 filed Nov. 1, 2007, which claims the benefit of Japanese Patent Application No. 2006-302727 filed Nov. 8, 2006, both of which are incorporated by reference herein. The International Application was published in Japanese on May 15, 2008 as WO2008/056597 A1 under PCT Article 21(2).

TECHNICAL FIELD

The present invention relates to a composition for a photo-alignment film, and an optically anisotropic medium obtained by laminating a layer including a polymerizable liquid crystal compound on top of a layer formed from the composition for a photo-alignment film and then polymerizing the layer including a polymerizable liquid crystal compound in an aligned state.

BACKGROUND ART

Birefringent stretched films have conventionally been used as retardation films used for eliminating phase difference in liquid crystal display devices, but recently, optically anisotropic media prepared by applying a polymerizable liquid crystal to a substrate provided with an alignment film and subsequently curing the liquid crystal molecules while in an aligned state have been developed as retardation films with more complex optical properties (for example, see Patent Document 1). These media are obtained by providing a polymer film of a polyimide or the like on a substrate, rubbing this polymer film in a single direction with a cloth or the like to generate an aligned film, applying a polymerizable liquid crystal to the surface of the film, thereby aligning the liquid crystal molecules with the rubbing direction, and then polymerizing the liquid crystal to fix the alignment, and by appropriate combination of the alignment direction of the alignment film and the state of alignment of the polymerizable liquid crystal, a retardation film can be obtained that has optical properties unattainable using a stretched birefringent film.

Recently, optical compensation sheets having excellent durability have also been developed by rubbing a polyimide coating film having a polymerizable group provided on top of a substrate, applying a discotic liquid crystal having a polymerizable group to the coating film, and chemically bonding the polyimide alignment film and the optically anisotropic layer of the discotic liquid crystal at the interface therebetween (for example, see Patent Document 2).

However, because the optical compensation sheet disclosed in Patent Document 2 uses a rubbed alignment film, scratches and dust generated during the rubbing can be problematic. Generated dust can be removed by washing or the like, but scratches cannot be removed, meaning there is a possibility of a significant deterioration in the optical uniformity of the laminated liquid crystal film.

On the other hand, optically anisotropic media in which a layer (A) that has been imparted with a liquid crystal alignment ability by irradiation with light, and a polymer layer (B) obtained by polymerizing a liquid crystal compound having a polymerizable group in an aligned state generated by the layer (A) are bonded and laminated together via covalent bonding have also been developed (for example, see Patent Document 3). Because these optically anisotropic media use a photo-alignment film, scratches and dust are not generated during production. Furthermore, because the layer (A) having a liquid crystal alignment ability and the polymer layer (B) are reacted together at the interface therebetween, the bonding at the interface is excellent, and an optically anisotropic medium of superior durability can be obtained.

However, with the optically anisotropic medium disclosed in Patent Document 3, if a plastic substrate such as a TAC film or PET film is used as the substrate, then peeling or the like may sometimes occur.

[Patent Document 1]
Japanese Unexamined Patent Application, First Publication No. Hei 5-215921
[Patent Document 2]
Japanese Unexamined Patent Application, First Publication No. 2001-89657
[Patent Document 3]
Japanese Unexamined Patent Application, First Publication No. 2005-173548

DISCLOSURE OF INVENTION

Problems to be Solved by the Invention

An object of the present invention is to provide a composition for a photo-alignment film that exhibits particularly superior adhesion to plastic substrates, and an optically anisotropic medium.

Means to Solve the Problems

The inventors of the present invention were able to achieve the above object by adding a specific polymer to a composition for a photo-alignment film as a way to improve adhesion.

Plastic substrates are formed of organic polymers. Accordingly, by including an organic polymer of a similar material within the photo-alignment film, the adhesion can be improved. In the present invention, a specific azo compound with the highest degree of sensitivity as a photo-alignment film is mixed with a polymer having a polar group that exhibits favorable solubility within the azo compound, and consequently, a photo-alignment film that exhibits particularly superior adhesion to plastic substrates can be obtained.

In other words, the present invention provides a composition for a photo-alignment film that includes an azo compound represented by general formula (1) and a polymer that exhibits mutual solubility with the azo compound represented by general formula (1).

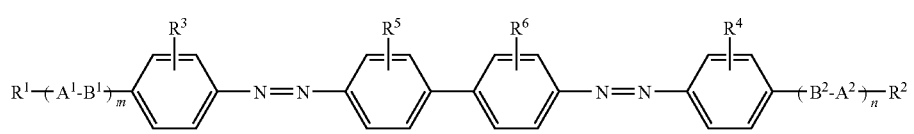

(1)

(In the formula (1), $R^1$ and $R^2$ each independently represents a hydroxyl group or a polymerizable functional group selected from the group consisting of a (meth)acryloyl group, (meth)acryloyloxy group, (meth)acryloylamino group, vinyl group, vinyloxy group and maleimide group, provided that at least one of $R^1$ and $R^2$ represents a polymerizable functional group, $A^1$ and $A^2$ each independently represents a single bond or a divalent hydrocarbon group that may be substituted with an alkoxy group, and $B^1$ and $B^2$ each independently represents a single bond, —O—, —CO—O—, —O—CO—, —CO—NH—, —NH—CO—, —NH—CO—O— or —O—CO—NH—, provided that a —O—O— linkage is not formed in the links to $R^1$ and $R^2$, m and n each independently represents an integer of 0 to 4 (wherein, when m or n is 2 or greater, the plurality of $A^1$, $B^1$, $A^2$, and $B^2$ groups may be respectively identical or different, and the $A^1$ or $A^2$ group sandwiched between the two $B^1$ groups or $B^2$ groups represents a divalent hydrocarbon group that may be substituted with an alkoxy group), $R^3$ to $R^6$ each independently represents a hydrogen atom, halogen atom, halogenated alkyl group, allyloxy group, cyano group, nitro group, alkyl group, hydroxyalkyl group, alkoxy group, carboxyl group or alkali metal salt thereof, alkoxycarbonyl group, halogenated methoxy group, hydroxyl group, sulfonyloxy group or alkali metal salt thereof, amino group, carbamoyl group, sulfamoyl group, or a polymerizable functional group selected from the group consisting of a (meth)acryloyl group, (meth)acryloyloxy group, (meth)acryloylamino group, vinyl group, vinyloxy group, and maleimide group.)

Furthermore, the present invention also provides a photo-alignment film which is obtained by forming a layer of the composition for a photo-alignment film according to the aspect described above on a substrate, and subsequently irradiating the layer with light to generate a liquid crystal alignment ability, wherein the haze of the photo-alignment film is not more than 1.

Furthermore, the present invention also provides an optically anisotropic medium, wherein a layer (A) obtained by irradiating a layer of the composition for a photo-alignment film described above with light to generate a liquid crystal alignment ability, and a polymer layer (B) obtained by polymerizing a liquid crystal compound having a polymerizable group in an aligned state generated by the layer (A) are bonded and laminated together by covalent bonds.

Moreover, the present invention also provides a method of producing the optically anisotropic medium described above, the method including: forming a layer of the composition for a photo-alignment film according to the aspect described above on a substrate, subjecting the layer to irradiation with polarized light or irradiation with unpolarized light from a tilted direction, thereby forming the layer (A), laminating a layer containing a polymerizable liquid crystal compound on top of the layer (A), and then polymerizing the compound represented by general formula (1) and the polymerizable liquid crystal compound by either light irradiation or heating.

Effect of the Invention

By using a composition for a photo-alignment film of the present invention, a photo-alignment film that exhibits excellent adhesion, and particularly superior adhesion to plastic substrates, and an optically anisotropic medium can be obtained.

BEST MODE FOR CARRYING OUT THE INVENTION (Composition for Photo-Alignment Film)
(Azo Compound)

In the present invention, an azo compound represented by general formula (1) is used.

In general formula (1), $R^1$ and $R^2$ each independently represents a hydroxyl group or a polymerizable functional group selected from the group consisting of a (meth)acryloyl group, (meth)acryloyloxy group, (meth)acryloylamino group, vinyl group, vinyloxy group and maleimide group, although compounds in which $R^1$ and $R^2$ both represent polymerizable functional groups are preferred in terms of their stability to light and heat. Amongst the polymerizable functional groups, a (meth)acryloyloxy group or maleimide group is preferred, and a maleimide group is particularly preferred as it does not require a polymerization initiator.

In those cases where $R^1$ represents a hydroxyl group, m is preferably 0. In those cases where $R^1$ represents a polymerizable functional group, m is preferably an integer of 1 or greater.

In those cases where $R^2$ represents a hydroxyl group, n is preferably 0. In those cases where $R^2$ represents a polymerizable functional group, n is preferably an integer of 1 or greater.

$A^1$ and $A^2$ each independently represents a single bond or a divalent hydrocarbon group that may be substituted with an alkoxy group, and examples of the divalent hydrocarbon group include linear alkylene groups of 1 to 18 carbon atoms such as a methylene group, ethylene group, trimethylene group, tetramethylene group, pentamethylene group, hexamethylene group, heptamethylene group, octamethylene group, nonamethylene group, decamethylene group, undecamethylene group or dodecamethylene group; branched alkylene groups of 1 to 18 carbon atoms such as a propane-1,2-diyl group, butane-1,3-diyl group, 2-methylpropane-1,3-diyl group, pentane-1,4-diyl group, 2-methylbutane-1,4-diyl group, hexane-1,5-diyl group, 2-methylpentane-1,5-diyl group or 3-methylpentane-1,5-diyl group; a 1,4-phenylene group; and condensed ring divalent groups such as a naphthalene-2,6-diyl group. Furthermore, examples of the divalent hydrocarbon group substituted with an alkoxy group include phenylene groups having a linear or branched alkoxy group of 1 to 18 carbon atoms such as a 2-methoxy-1,4-phenylene group, 3-methoxy-1,4-phenylene group, 2-ethoxy-1,4-phenylene group, 3-ethoxy-1,4-phenylene group or 2,3,5-trimethoxy-1,4-phenylene group.

$B^1$ and $B^2$ each independently represents a single bond, —O—, —CO—O—, —O—CO—, —CO—NH—, —NH—CO—, —NH—CO—O— or —O—CO—NH—, and of these, a single bond, —O—, —CO—O— or —O—CO— is preferred.

Of the compounds represented by general formula (1), compounds in which $R^1$ and $R^2$ each represents an acryloyloxy group and the two structures below are each represented by one of the corresponding structures shown below yield a more powerful alignment controlling force, and are consequently particularly preferred.

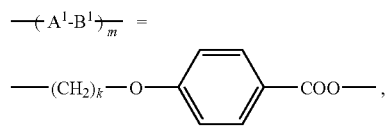

-continued

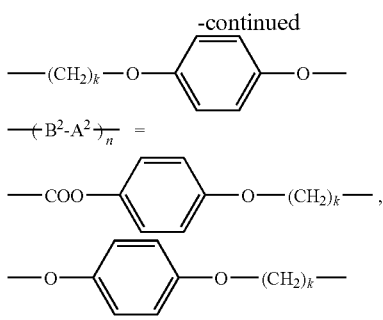

(In the formulas, $A^1$, $A^2$, $B^1$, $B^2$, n and m are the same as defined for general formula (1), and k represents an integer of 1 to 18.)

$R^3$ to $R^6$ each independently represents a hydrogen atom, halogen atom, halogenated alkyl group, allyloxy group, cyano group, nitro group, alkyl group, hydroxyalkyl group, alkoxy group, carboxyl group or alkali metal salt thereof, alkoxycarbonyl group, halogenated methoxy group, hydroxyl group, sulfonyloxy group or alkali metal salt thereof, amino group, carbamoyl group, sulfamoyl group, or a polymerizable functional group selected from the group consisting of a (meth)acryloyl group, (meth)acryloyloxy group, (meth)acryloylamino group, vinyl group, vinyloxy group and maleimide group. The carboxyl group or sulfonyloxy group may be in the form of a salt with an alkali metal such as lithium, sodium or potassium.

Examples of the halogen atom include a fluorine atom or chlorine atom. Examples of the halogenated alkyl group include a trichloromethyl group or trifluoromethyl group.

Examples of the halogenated methoxy group include a chloromethoxy group or trifluoromethoxy group.

Examples of the alkoxy group include alkoxy groups in which the alkyl group portion is a lower alkyl group of 1 to 6 carbon atoms or a cycloalkyl group of 3 to 6 carbon atoms, and lower alkyl groups of 1 to 6 carbon atoms that have been substituted with a lower alkoxy group of 1 to 6 carbon atoms. Specific examples of the lower alkyl group of 1 to 6 carbon atoms include a methyl group, ethyl group, propyl group, butyl group, pentyl group, hexyl group or 1-methylethyl group. Specific examples of lower alkyl groups of 1 to 6 carbon atoms that have been substituted with a lower alkoxy group of 1 to 6 carbon atoms include a methoxymethyl group, 1-ethoxyethyl group or tetrahydropyranyl group.

Examples of the hydroxyalkyl group include hydroxyalkyl groups of 1 to 4 carbon atoms, and specific examples include a hydroxymethyl group, 1-hydroxyethyl group, 2-hydroxyethyl group, 1-hydroxypropyl group, 2-hydroxypropyl group, 3-hydroxypropyl group or 1-hydroxybutyl group.

Examples of the carbamoyl group include groups in which the alkyl portion contains 1 to 6 carbon atoms, such as a methyl group, ethyl group, propyl group, butyl group, pentyl group, hexyl group or 1-methylethyl group.

Of these possibilities, a halogen atom, carboxyl group, halogenated methyl group, halogenated methoxy group, methoxy group, ethoxy group, propoxy group, hydroxymethyl group, carbamoyl group, dimethylcarbamoyl group or cyano group is preferred, and a carboxyl group, hydroxymethyl group or trifluoromethyl group is particularly preferred in terms of obtaining superior alignment.

Furthermore, compounds in which $R^3$ and $R^4$ are positioned at the meta positions of the phenylene groups at either end of a 4,4'-bis(phenylazo)biphenyl structure yield a superior photo-alignment film, and compounds in which $R^5$ and $R^6$ are substituted at the 2 and 2' positions of a 4,4'-bis(phenylazo)biphenyl structure are particularly preferred, as they yield excellent photo-alignment properties.

Moreover, of the various possibilities, the carboxyl group or sulfonyloxy group is preferably a functional group that provides superior affinity with the transparent electrode of glass or ITO in order to ensure uniform formation of the photo-alignment film on the substrate surface, and a carboxyl group or alkali metal salt thereof, or a sulfonyloxy group or alkali metal salt thereof is particularly desirable.

Of the azo compounds represented by general formula (1), an azo compound of the structure shown below is preferred.

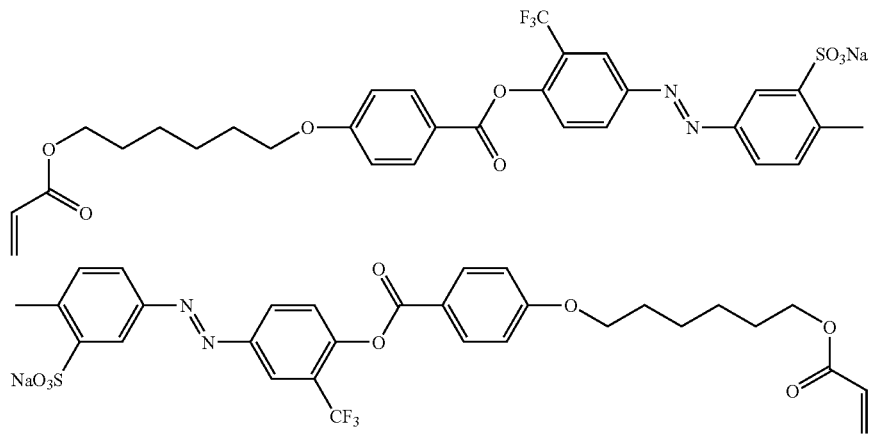

As the compound having a photo-alignment group used in the present invention, either a single compound may be used alone, or a mixture of two or more different compounds may be used.

(Polymer that Exhibits Mutual Solubility with the Azo Compound Represented by General Formula (1))

The polymer used in the present invention may use any conventional polymer, provided the polymer exhibits mutual solubility with the azo compound represented by general formula (1). Examples of polymers that exhibit this solubility include mainly polymers containing large numbers of polar groups. Examples of these polar groups include the structures shown below:

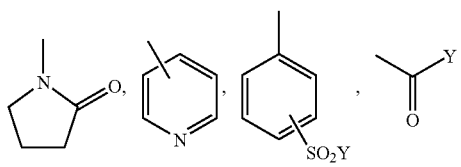

(In the formulas, Y represents a hydroxyl group, —ONa, —OK, —OLi or an amino group), and polymers containing these types of substituents are preferred. Of the above structures, the structures shown below are particularly preferred.

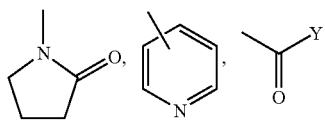

(In the Formulas, Y Represents a Hydroxyl Group, —Ona, —Ok or an Amino Group.)

Examples of polymers containing these structures are numerous, but specific examples of preferred polymers are listed below.

Examples of polymers containing amide groups include polyvinylpyrrolidone and polyacrylamide.

Examples of polymers containing pyridyl groups include poly(2-vinylpyridine), poly(4-vinylpyridine), 2-vinylpyridine/styrene copolymers, 4-vinylpyridine/styrene copolymers and 4-vinylpyridine/methacrylate copolymers.

Examples of polymers containing sulfonyl groups include poly(p-styrenesulfonic acid) and the sodium salt thereof.

Examples of polymers containing carboxyl groups include polyacrylic acid and the sodium salt thereof, polymethacrylic acid and the sodium salt thereof, acrylic acid/acrylamide copolymers and the sodium salts thereof, acrylic acid/maleic acid copolymers and the sodium salts thereof, ethylene/acrylic acid copolymers, acrylonitrile/acrylic acid copolymers, polymaleic acid, styrene/maleic acid copolymers and the sodium salts thereof, isobutylene/maleic acid copolymers and the sodium salts thereof, styrenesulfonic acid/maleic acid copolymers and the sodium salts thereof, methyl vinyl ether/maleic acid copolymers, and vinyl chloride/vinyl acetate/maleic acid copolymers.

These polymers may also include other substituents, provided the polymer exhibits mutual solubility with the azo compound represented by general formula (1). Furthermore, a mixture of two or more types of these polymers may also be used.

Of the above possibilities, polyvinylpyrrolidone, polyvinylpyridine or polyacrylic acid is particularly preferred.

As the polymer used in the present invention, either a commercially available product may be used, or the polymer may be synthesized using a conventional method. Any of the various polymerization methods may be used as the synthesis method, including bulk polymerization, solution polymerization, emulsion polymerization, suspension polymerization, radiation-initiated polymerization and photopolymerization. Further, examples of the polymerization initiator include benzoyl peroxide and 2,2'-azobisisobutyronitrile.

In the present invention, "mutual solubility" is indicated by a turbidity (haze) of not more than 1 for a photo-alignment film formed using a composition for a photo-alignment film obtained by mixing the azo compound represented by general formula (1) and the polymer. If the haze exceeds 1, then the photo-alignment film begins to appear cloudy to the naked eye, and the adhesion begins to deteriorate. The inventors of the present invention discovered that when the photo-alignment film and the polymer layer (B) described below are laminated together, the adhesion as an optically anisotropic medium correlates with the haze of the photo-alignment film. If the haze is large, then there is not only a loss in the smoothness of the surface of the photo-alignment film that contacts the polymer layer (B), but the azo compound and the polymer tend to undergo a phase separation, and it is thought that these factors result in a deterioration in the adhesion between the substrate and the photo-alignment film.

The haze reported in the present invention was measured in accordance with the test method for total light transmittance for transparent plastic materials prescribed in JIS K 7361-1 and the test method for optical properties of plastics prescribed in JIS K 7105, or in accordance with the plastic transparent materials prescribed in JIS K 7136, and refers to the turbidity represented by the ratio of diffuse transmitted light/total transmitted light for a photo-alignment film of thickness 20 nm, measured using a haze meter NDH2000 manufactured by Nippon Denshoku Industries Co., Ltd.

Specifically, the haze was calculated using the equation shown below.

Haze=(turbidity of the photo-alignment film formed on top of substrate, measured together with the substrate)−(turbidity of the substrate alone)

From the viewpoint of maintaining favorable alignment of the liquid crystal, the weight average molecular weight of the polymer used in the present invention is preferably within a range from 300 to 100,000, and is more preferably from 300 to 50,000. Further, for the same reason, the proportion of the polymer relative to the total weight of the composition for a photo-alignment film is preferably within a range from 1 to 50% by weight, and is more preferably from 5 to 30% by weight.

(Solvent)

The composition for a photo-alignment film used in the present invention typically uses a solvent to improve the coating properties. There are no particular limitations on the solvent used, and a solvent capable of dissolving the azo compound is typically used. Examples thereof include alcohol-based solvents such as methanol and ethanol, diol-based solvents such as ethylene glycol, propylene glycol and 1,3-butanediol, ether-based solvents such as tetrahydrofuran, 2-methoxyethanol, 2-butoxyethanol, 2-(2-ethoxyethoxy)ethanol and 2-(2-butoxyethoxy)ethanol, amide-based solvents such as 2-pyrrolidone, N-methylpyrrolidone, dimethylformamide and dimethylacetamide, as well as γ-butyrolactone, chlorobenzene and dimethylsulfoxide. These solvents may be used either alone or in mixtures of two or more different solvents. Further, conventional additives may also be added, provided they do not impair the effects of the present invention.

The composition is usually prepared with a solid fraction of at least 0.2% by weight. Preparation of a composition having a solid fraction of 0.5 to 10% by weight is preferred.

(Additives)

Conventional additives may be used to enable the composition for a photo-alignment film used in the present invention to be applied more uniformly to generate a photo-alignment film having a uniform film thickness. For example, additives such as leveling agents, thixotropic agents, surfactants, ultraviolet absorbers, infrared absorbers, antioxidants and surface treatment agents may be added in quantities that cause no significant deterioration in the liquid crystal alignment ability.

(Method of Producing Photo-Alignment Film)

In order to obtain a photo-alignment film using the composition for a photo-alignment film according to the present invention, the composition for a photo-alignment film is applied to a substrate and dried, and is then irradiated with ultraviolet light or light such as visible light having anisotropic properties, thereby aligning the compound represented by general formula (1). In those cases where the azo compound represented by general formula (1) includes a polymerizable group, the photo-alignment film can be obtained by polymerizing this polymerizable group, either during or after alignment.

(Application, Substrate)

The substrate used in the present invention may use the type of substrates typically used for a liquid crystal display element or optically anisotropic medium, and there are no particular limitations on the substrate material provided it has sufficient heat resistance to withstand the drying conducted following application of the composition for a photo-alignment film or the heating performed during production of a liquid crystal display element. Examples of this type of substrate include glass substrates, ceramic substrates and plastic substrates. Examples of materials that may be used for the plastic substrate include cellulose derivatives, polycycloolefin derivatives, polyesters, polyolefins, polycarbonates, polyacrylates, polyarylates, polyethersulfones, polyimides, polyphenylene sulfides, polyphenylene ethers, nylons and polystyrenes.

Conventional methods can be used as the coating method, including spin coating methods, gravure printing methods, flexographic printing methods, inkjet methods, die coating methods and dipping methods. Because a solution that has been diluted with an organic solvent is usually applied, the coating film for the photo-alignment film is obtained by drying the solution following application.

Because the composition for a photo-alignment film of the present invention exhibits particularly superior adhesion to plastic substrates, the use of a substrate such as a PET film, polyarylate, cellulose derivative or polycycloolefin derivative is particularly preferred as it enables superior manifestation of the effects of the present invention.

(Photoisomerization Step)

The coating film for the photo-alignment film obtained using the method described above is irradiated with a light having anisotropy (hereafter this step is abbreviated as "the photoisomerization step"), so that the layer formed from the composition for a photo-alignment film is irradiated, thereby generating a layer (A) that has been imparted with a liquid crystal alignment ability (hereafter abbreviated as "the layer (A)"). Examples of the light having anisotropy used in the photoisomerization step include polarized light such as linear polarized light or elliptically polarized light, or unpolarized light that is irradiated onto the substrate surface from a tilted direction. The polarized light may be either linear polarized light or elliptically polarized light, but in order to achieve efficient photo-alignment, the use of linear polarized light having a high extinction ratio is preferred.

Furthermore, because a polarization filter or the like must be used in the light irradiation apparatus in order to obtain polarized light, the intensity of the light irradiated onto the film surface tends to decrease, whereas in a method in which unpolarized light is irradiated onto the film surface from a tilted direction, a polarization filter or the like is not required in the irradiation apparatus, which offers the advantage that a larger light intensity can be obtained, enabling a shortening of the irradiation time required to achieve photo-alignment. The incident angle of the unpolarized light in this case is preferably within a range from 10° to 80° relative to a substrate normal line, and if consideration is given to ensuring uniformity of the irradiation energy across the irradiated surface, the pretilt angle obtained, and the alignment efficiency, then an incident angle of 20° to 60° is more preferred, and an angle of 45° is the most desirable.

As the irradiated light, ultraviolet light having a wavelength within a range from 350 to 500 nm, which corresponds to a strong absorption due to the π→π* transition of azobenzene, is particularly preferred.

Examples of the light source for the light irradiation include a xenon lamp, high pressure mercury lamp, ultra high pressure mercury lamp, metal halide lamp, or ultraviolet light laser such as a KrF or ArF laser. In the present invention, because the photo-alignment group is an azobenzene structure, an ultra high pressure mercury lamp, which has a particularly high light intensity for ultraviolet light of 365 nm, can be used effectively.

By passing the light from the light source through a polarizing filter or a polarizing prism such as a Glan-Thompson prism or Glan-Taylor prism, a linear polarized ultraviolet light can be obtained.

Furthermore, regardless of whether polarized light or unpolarized light is used, the irradiated light is most preferably a substantially parallel light beam.

Further, if a photomask is used during irradiation of the polarized light, then a liquid crystal alignment ability can be generated in the photo-alignment film in a pattern in two or more different directions. Specifically, following application and drying of the composition for a photo-alignment film according to the present invention, a photomask is placed over the substrate, and the entire surface is then irradiated with the polarized or unpolarized light, thereby imparting a liquid crystal alignment ability in a pattern represented by the exposed portions. If required, this process may be repeated a number of times, enabling the liquid crystal alignment ability to be generated in a plurality of directions.

Moreover, depending on the circumstances, the photo-alignment film may be cooled following the above photoisomerization step. Any method that enables the photoisomerized coating film for the photo-alignment film to be cooled may be used as the cooling method, and for example, cooling of the coating film and substrate may be conducted using conventional cooling devices such as a cold plate, a chamber or a low temperature thermostatic chamber.

The cooling conditions require a cooling period of one minute or longer at a cooling temperature of 20° C., but if the cooling temperature is lower than 20° C., then this limit may not apply. The cooling temperature may be any temperature greater than the melting point of the solvent being used, and is preferably within a range from −40° C. to 20° C. In order to obtain a more stable photo-alignment film with an improved liquid crystal alignment ability, a cooling temperature of 10° C. or lower is preferred, and the cooling time is preferably 5 minutes or longer. Moreover, a cooling temperature of 5° C. or lower is preferred in order to shorten the cooling time.

Furthermore, in order to prevent condensation, the cooling process may be conducted under an atmosphere of dry air, nitrogen or argon, or the cooling process may be conducted while a stream of dry air or nitrogen or the like is blown onto the substrate.

(Haze)

In the photo-alignment film obtained in the present invention, because the azo compound represented by general formula (1) and the polymer exhibit mutual solubility, the film is transparent. As described above, as an indicator of this transparency, the film has a turbidity (haze) of not more than 1. If the haze exceeds 1, then the photo-alignment film begins to appear cloudy to the naked eye, and the adhesion begins to deteriorate.

The inventors of the present invention discovered that the adhesion at the interface of an optically anisotropic medium obtained by laminating the photo-alignment film of the present invention and the polymer layer (B) described below correlates with the haze of the photo-alignment film. As the haze increases, the solubility deteriorates and the azo compound and the polymer tend to undergo a phase separation. In other words, it is thought that the smoothness of the surface of the photo-alignment film that contacts the polymer layer (B) is lost, causing a deterioration in the adhesion between the substrate and the photo-alignment film.

(Method of Producing Optically Anisotropic Medium of the Present Invention)

In those cases where $R^1$ and $R^2$ in the compound represented by general formula (1) are hydroxyl groups, an optically anisotropic medium of the present invention can be obtained by laminating a layer containing a liquid crystal compound having a polymerizable group onto a layer of the photo-alignment film obtained using the method described above, and then polymerizing the liquid crystal compound in an aligned state generated by the photo-alignment film by conducting either light irradiation or heating.

Alternatively, in those cases where $R^1$ and $R^2$ in the compound represented by general formula (1) are polymerizable functional groups, an optically anisotropic medium can be obtained by forming, on a substrate, a laminated film of a layer (A) obtained by irradiating a layer of the aforementioned composition for a photo-alignment film with light to generate a liquid crystal alignment ability (hereafter referred to as "the layer (A)"), and a polymer layer (B) obtained by polymerizing a liquid crystal compound having a polymerizable group in an aligned state generated by the layer (A) (hereafter referred to as "the layer (B)"), and reacting the polymerizable groups within the two layers, either while the liquid crystal alignment ability is being generated in the layer A, or after the liquid crystal alignment ability has been generated and while the aligned state of the liquid crystal compound is maintained. In these cases, each of the layers needs not necessarily have undergone complete polymerization curing, provided that the interface between the layer (A) and the layer (B) is bonded by covalent bonds.

(Polymer layer (B))
(Liquid Crystal Compound Having a Polymerizable Group)

In the present invention, the liquid crystal compound having a polymerizable group that constitutes the polymer layer (B) exhibits liquid crystallinity, either alone or in a composition with one or more other liquid crystal compounds. There are no particular limitations on the compound, provided it is a liquid crystal compound having a polymerizable group, and examples include calamitic polymerizable liquid crystal compounds having a rigid region known as a mesogen in which a plurality of structures such as 1,4-phenylene groups or 1,4-cyclohexylene groups are linked, and a polymerizable functional group such as a (meth)acryloyl group, vinyloxy group or epoxy group, such as those compounds disclosed in the "Handbook of Liquid Crystals" (edited by D. Demus, J. W. Goodby, G. W. Gray, H. W. Spiess and V. Vill, published by Wiley-VCH, 1998), in Chemical Review Quarterly No. 22, Chemistry of Liquid Crystals (edited by The Chemical Society of Japan, 1994), or in Japanese Unexamined Patent Application, First Publication No. Hei 7-294735, Japanese Unexamined Patent Application, First Publication No. Hei 8-3111, Japanese Unexamined Patent Application, First Publication No. Hei 8-29618, Japanese Unexamined Patent Application, First Publication No. Hei 11-80090, Japanese Unexamined Patent Application, First Publication No. Hei 11-148079, Japanese Unexamined Patent Application, First Publication No. 2000-178233, Japanese Unexamined Patent Application, First Publication No. 2002-308831 or Japanese Unexamined Patent Application, First Publication No. 2002-145830; calamitic polymerizable liquid crystal compounds having a maleimide group such as those disclosed in Japanese Unexamined Patent Application, First Publication No. 2004-2373 or Japanese Unexamined Patent Application, First Publication No. 2004-99446; calamitic polymerizable liquid crystal compounds having an allyl ether group such as those disclosed in Japanese Unexamined Patent Application, First Publication No. 2004-149522; and discotic polymerizable compounds such as those disclosed in the "Handbook of Liquid Crystals" (edited by D. Demus, J. W. Goodby, G. W. Gray, H. W. Spiess and V. Vill, published by Wiley-VCH, 1998), in Chemical Review Quarterly No. 22, Chemistry of Liquid Crystals (edited by The Chemical Society of Japan, 1994), or in Japanese Unexamined Patent Application, First Publication No. Hei 7-146409. Of these compounds, calamitic liquid crystal compounds having a polymerizable group are preferred, as compounds for which the liquid crystal temperature range is a low temperature close to room temperature can be produced relatively easily.

(Polymerization Initiator)

In order to polymerize the polymerizable liquid crystal composition, either irradiation with ultraviolet light or the like or heating is generally used. In those cases where the polymerization is conducted by light irradiation, conventional compounds may be used as the photopolymerization initiator, and specific examples include 2-hydroxy-2-methyl-1-phenylpropan-1-one (DAROCURE 1173, manufactured by Merck KGaA), 1-hydroxycyclohexyl phenyl ketone (IRGACURE 184, manufactured by Ciba Specialty Chemicals Inc.), 1-(4-isopropylphenyl)-2-hydroxy-2-methylpropan-1-one (DAROCURE 1116, manufactured by Merck KGaA), 2-methyl-1-[(methylthio)phenyl]-2-morpholinopropane-1 (IRGACURE 907, manufactured by Ciba Specialty Chemicals Inc.), benzil methyl ketal (IRGACURE 651, manufactured by Ciba Specialty Chemicals Inc.), a mixture of 2,4-diethylthioxanthone (KAYACURE DETX, manufactured by Nippon Kayaku Co., Ltd.) and ethyl p-dimethylaminobenzoate (KAYACURE EPA, manufactured by Nippon Kayaku Co., Ltd.), a mixture of isopropylthioxanthone (CANTACURE ITX, manufactured by Ward Blekinsop and Co. Ltd.) and ethyl p-dimethylaminobenzoate, and acylphosphine oxide (LUCIRIN TPO, manufactured by BASF Corporation). The quantity used of the photopolymerization initiator is preferably not more than 10% by weight, and more preferably from 0.5 to 5% by weight, relative to the weight of the polymerizable liquid crystal compound.

In the case of a thermal polymerization, conventional compounds may be used as the thermal polymerization initiator, and specific examples include organic peroxides such as methyl acetoacetate peroxide, cumene hydroperoxide, benzoyl peroxide, bis(4-t-butylcyclohexyl) peroxydicarbonate, t-butyl peroxybenzoate, methyl ethyl ketone peroxide, 1,1-bis(t-hexylperoxy)-3,3,5-trimethylcyclohexane, p-pentahydroperoxide, t-butyl hydroperoxide, dicumyl peroxide, isobutyl peroxide, di(3-methyl-3-methoxybutyl) peroxydicarbonate and 1,1-bis(t-butylperoxy)cyclohexane, azonitrile compounds such as 2,2'-azobisisobutyronitrile and 2,2'-azobis(2,4-dimethylvaleronitrile), azoamidine compounds such as 2,2'-azobis(2-methyl-N-phenylpropion-amidine) dihydrochloride, azoamide compounds such as 2,2'-azobis{2-methyl-N-[1,1-bis(hydroxymethyl)-2-hydroxyethyl]propionamide}, and alkylazo compounds such as 2,2'-azobis(2,4,4-trimethylpentane). The quantity used of the thermal polymerization initiator is preferably not more than 10% by weight, and more preferably from 0.5 to 5% by weight, relative to the weight of the polymerizable liquid crystal compound.

The polymerization operation for the layer (B) is generally conducted by irradiation with light such as ultraviolet light, or by heating. In those cases where the polymerization is conducted by light irradiation, in order to avoid disturbing the aligned state of the photo-alignment film formed from the composition for a photo-alignment film according to the present invention, the irradiation is preferably performed using a wavelength outside of the light absorption band of the dichroic compound, for example, outside of the absorption band of the azobenzene structure or anthraquinone structure. Specifically, irradiation with ultraviolet light having a wavelength of 320 nm or less is preferred, and irradiation with light having a wavelength of 250 to 300 nm is the most desirable. However, in those cases where ultraviolet light of 320 nm or less causes decomposition or the like of the photo-alignment film or the polymerizable liquid crystal composition, conducting the polymerization treatment with ultraviolet light having a wavelength of 320 nm or higher may be preferable.

In order to prevent disturbing the alignment of the previously generated photo-alignment film, this light is preferably a diffuse light, and is preferably unpolarized. Accordingly, it is usually preferable to use a photopolymerization initiator that has a different light absorption wavelength band from the light absorption band of the dichroic compound. However, if the light for effecting the polymerization is irradiated from the same direction as that used in the photo-alignment operation, then there is no danger of disturbing the aligned state of the photo-aligned material, and therefore light of any desired wavelength may be used.

On the other hand, in the case of a polymerization under heating, the polymerization is preferably conducted either at or below the temperature at which the polymerizable liquid crystal composition exhibits a liquid crystal phase, and particularly in those cases where a thermal polymerization initiator is used that releases radicals upon heating, the use of a polymerization initiator for which this cleavage temperature is within the above temperature range is preferred. Further, in those cases where a thermal polymerization initiator is used in combination with a photopolymerization initiator, then in addition to the above restriction on the temperature range, the polymerization temperature and each of the polymerization initiators are preferably selected so that the polymerization rates of the two layers, namely the photo-alignment film and the polymerizable liquid crystal film, are not greatly different. The heating temperature varies depending on the transition temperature for the polymerizable liquid crystal composition from the liquid crystal phase to the isotropic phase, but is preferably conducted at a temperature that is lower than the temperature at which the heating induces heterogeneous polymerization, and is preferably within a range from 20 to 300° C., more preferably from 30 to 200° C., and still more preferably from 30 to 120° C. Furthermore, in those cases where, for example, the polymerizable groups are (meth)acryloyl groups, the heating is preferably conducted at a temperature lower than 90° C.

In order to stabilize the solvent resistance properties and heat resistance of the obtained optically anisotropic medium, the optically anisotropic medium may be subjected to a heat treatment. In such a case, heating is preferably conducted at a temperature equal to or higher than the glass transition temperature of the aforementioned polymerizable liquid crystal film. Typically, a temperature within a range from 50 to 300° C. is preferred, and a temperature from 80 to 200° C. is more preferred.

EXAMPLES

The present invention is described in further detail below using a series of Synthesis Examples, Example and Comparative Examples, although the present invention is in no way limited by these Examples. Unless stated otherwise, "parts" and "%" refer to weight-referenced values.

(Preparation of Photo-Alignment Film Composition (1))

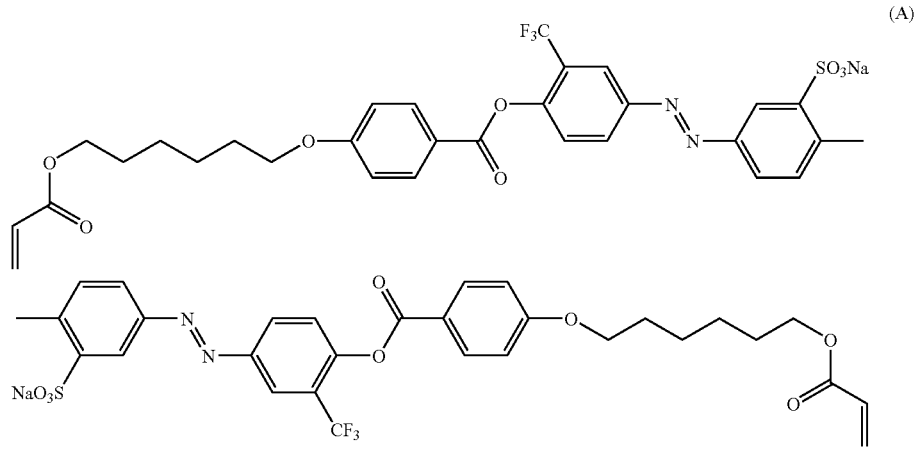

(A)

1 part of the compound represented by formula (A) and 0.2 parts of polyvinylpyrrolidone were added to a solvent composed of 30 parts of 2-butoxyethanol, 30 parts of 1-butanol, 30 parts of water and 10 parts of propylene glycol, thereby yielding a photo-alignment film composition A. The resulting solution was then filtered through a 0.45 μm membrane filter, yielding a photo-alignment film composition (1). The compound represented by formula (A) was obtained using the method disclosed in Japanese Unexamined Patent Application, First Publication No. 2002-250924.

(Preparation of Photo-Alignment Film Compositions (2) to (12))

Photo-alignment film compositions (2) to (12) were obtained using the same method as that described for the photo-alignment film composition (1). The formulation for each composition is shown in Table 1.

TABLE 1

| Composition | Azo compound/ blend quantity (parts) | Polymer/blend quantity (parts) | Photopolymerization initiator/ blend quantity (parts) | Solvent 1 | Solvent 2 | Solvent 3 |
| --- | --- | --- | --- | --- | --- | --- |
| (1) | A/1 | Polyvinylpyrrolidone/0.2 | None | 33 | 33 | 33 |
| (2) | A/1 | Polyvinylpyrrolidone/0.2 | V65/0.02 | 33 | 33 | 33 |
| (3) | A/1 | Polyvinylpyrrolidone/0.2 | IRGACURE 907/0.02 | 33 | 33 | 33 |
| (4) | A/1 | Sodium polyacrylate/0.2 | None | 33 | 33 | 33 |
| (5) | A/1 | Poly(sodium p-styrenesulfonate)/0.2 | None | 33 | 33 | 33 |
| (6) | A/1 | Poly(4-vinylpyridine)/0.2 | None | 33 | 33 | 33 |
| (7) | A/1 | Poly(2-vinylpyridine)/0.2 | None | 33 | 33 | 33 |
| (8) | B/1 | Polyacrylic acid/0.2 | None | 33 | 33 | 33 |
| (9) | B/1 | Polyacrylic acid/0.5 | None | 33 | 33 | 33 |
| (10) | A/1 | None | None | 33 | 33 | 33 |
| (11) | A/1 | None | V65/0.02 | 33 | 33 | 33 |
| (12) | B/1 | None | None | 33 | 33 | 33 |
| (13) | A/1 | Polyethyleneimine/0.2 | None | 33 | 33 | 33 |
| (14) | A/1 | Sodium polyvinylsulfonate/0.2 | None | 33 | 33 | 33 |

In Table 1, Solvent 1 represents water, Solvent 2 represents 2-butoxyethanol, and Solvent 3 represents dipropylene glycol monomethyl ether. Furthermore, the azo compound (B) represents the compound shown below.

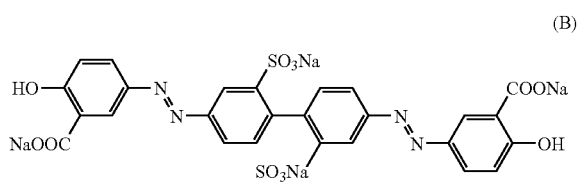

(B)

The polymers are as described below.
Polyvinylpyrrolidone: manufactured by Wako Pure Chemical Industries, Ltd. (Mw: 30,000)
Sodium polyacrylate: manufactured by Aldrich Co., Ltd. (Mw: 2,100)
Poly(sodium p-styrenesulfonate): manufactured by Wako Pure Chemical Industries, Ltd. (Mw: 50,000)
Poly(4-vinylpyridine): manufactured by Sigma Aldrich Co., Ltd. (Mw: 60,000)
Poly(2-vinylpyridine): manufactured by Aldrich Co., Ltd. (Mw: 11,000)
Polyacrylic acid: manufactured by Aldrich Co., Ltd. (Mw: 1,800)
Polyethyleneimine: manufactured by Wako Pure Chemical Industries, Ltd. (Mw: 600)
Sodium polyvinylsulfonate: manufactured by Polysciences Inc. (Mw: 17,000)

(Preparation of Polymerizable Liquid Crystal Composition (LC-1))

11 parts of a compound represented by formula (g), 9 parts of a compound represented by formula (h), 16.5 parts of a compound represented by formula (j), 11 parts of a compound represented by formula (k), and 2.5 parts of a compound represented by formula (l) were dissolved in 50 parts of xylene, and 1.2 parts of IRGACURE 907 (manufactured by Ciba Specialty Chemicals Inc.) and 0.3 parts of an acrylic copolymer represented by formula (i) were then added, yielding a solution. The thus obtained solution was filtered through a 0.45 µm membrane filter, yielding a polymerizable liquid crystal composition (LC-1).

(Preparation of Polymerizable Liquid Crystal Composition (LC-2))

In the preparation of the polymerizable liquid crystal composition (LC-1) described above, with the exception of using 2,2'-azobis(2,4-dimethylvaleronitrile) (V65, manufactured by Wako Pure Chemical Industries, Ltd.) instead of the IRGACURE 907, preparation was conducted in the same manner as the polymerizable liquid crystal composition (LC-1), yielding a polymerizable liquid crystal composition (LC-2).

(Preparation of Polymerizable Liquid Crystal Composition (LC-3))

15 parts of the compound represented by formula (g) and 15 parts of the compound represented by formula (h) were dissolved in 70 parts of xylene, and 1.2 parts of IRGACURE 907 (manufactured by Ciba Specialty Chemicals Inc.) and 0.3 parts of the acrylic copolymer represented by formula (i) were then added, yielding a solution. The thus obtained solution was filtered through a 0.45 µm membrane filter, yielding a polymerizable liquid crystal composition (LC-3).

(g)
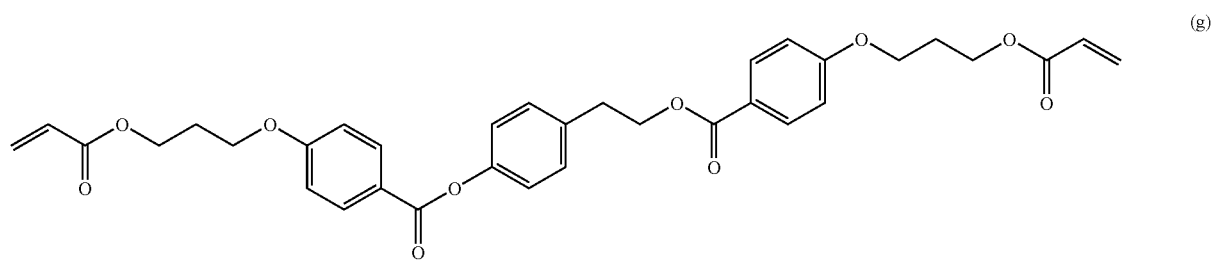
(h)
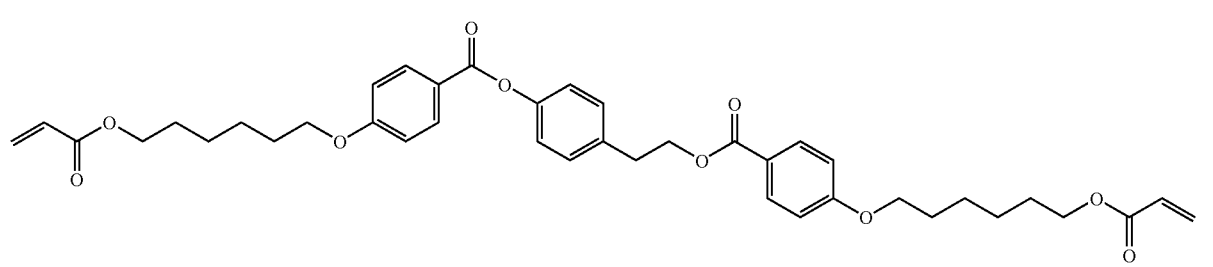
(i)
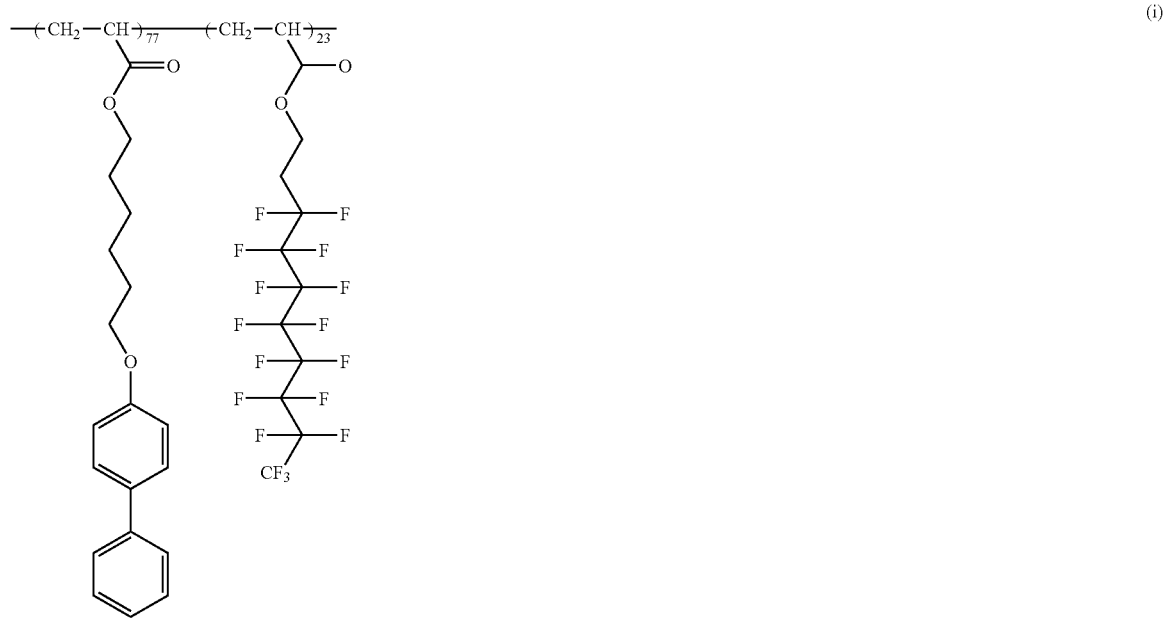
(j)
(k)
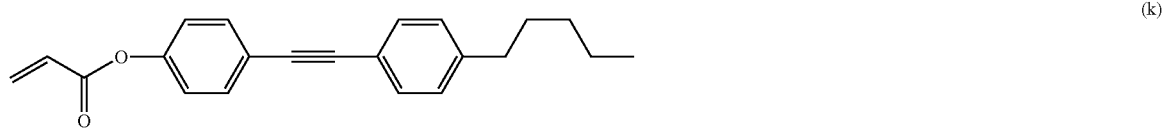
(l)
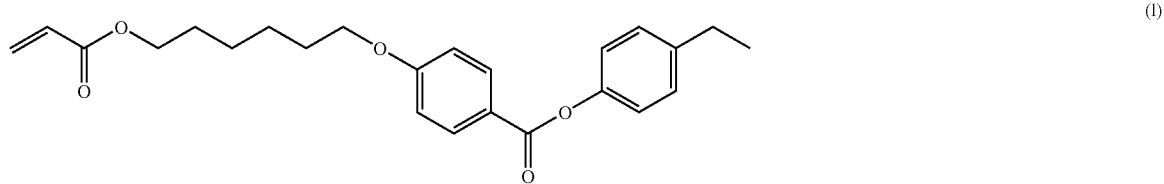

Evaluation of Optically Anisotropic Medium

Example 1

The photo-alignment film composition (1) was applied to a PET film of thickness 100 μm using a spin coater, and was then dried at 80° C. for one minute. The dried film thickness at this point was 15 nm.

Subsequently, the light from an ultra high pressure mercury lamp was passed through a wavelength cut filter, a band pass filter and a polarizing filter, and the resulting parallel beam of linear polarized visible-ultraviolet light having a wavelength in the vicinity of 365 nm (irradiation intensity: 20 mW/cm$^2$) was irradiated onto the substrate from a perpendicular direction, thereby yielding a photo-alignment film. The irradiation dose was 1 J/cm$^2$.

(Haze Measurement)

Haze was measured in accordance with the test method for total light transmittance for transparent plastic materials prescribed in JIS K 7361-1 and the test method for optical properties of plastics prescribed in JIS K 7105, or in accordance with the plastic transparent materials prescribed in JIS K 7136, and refers to the turbidity represented by the ratio of diffuse transmitted light/total transmitted light for a photo-alignment film of thickness 20 nm, measured using a haze meter NDH2000 manufactured by Nippon Denshoku Industries Co., Ltd.

Specifically, the haze was calculated using the equation shown below.

Haze=(turbidity of the photo-alignment film formed on top of substrate, measured together with the substrate)−(turbidity of the substrate alone)

Measurement of the haze of the PET film used as the substrate revealed a haze of 0.43. Measurement of the subsequently obtained photo-alignment film, including the PET film, revealed a haze of 0.45. Accordingly, the haze for the photo-alignment film was 0.02.

The polymerizable liquid crystal composition (LC-1) was applied to the obtained photo-alignment film using a spin coater, and following drying for one minute at 80° C., a uniform optically anisotropic medium was obtained by irradiating 1 J/cm$^2$ of ultraviolet light onto the composition under a nitrogen atmosphere. The retardation was 270 nm. The result of inspecting the film state of the obtained optically anisotropic medium was evaluated in accordance with the following external appearance criteria. The result is shown in Table 2.

(External Appearance Evaluation)

A: Absolutely no defects apparent to the naked eye, and absolutely no defects visible upon inspection using a polarized light microscope.

B: Absolutely no defects apparent to the naked eye, but unaligned portions detected upon inspection using a polarized light microscope.

C: No defects apparent to the naked eye, but unaligned portions detected across the entire medium upon inspection using a polarized light microscope.

D: Some defects apparent to the naked eye, and unaligned portions detected across the entire medium upon inspection using a polarized light microscope.

E: Irregularities noticeable to the naked eye across the entire photo-alignment film.

(Adhesion Evaluation)

Furthermore, in order to evaluate the adhesive strength of the substrate/photo-alignment layer (A)/polymerizable liquid crystal layer (B) structure of the obtained optically anisotropic medium, a cutter was used to insert cuts in a square grid pattern in a 1 cm square sample of the obtained optically anisotropic medium, thus forming a grid pattern of 1 mm squares. Cellophane tape was stuck to the squares of the grid pattern, and then pulled up in a vertical direction, and the number of remaining squares was counted. The above operation was repeated 5 times, and the average value was determined. The result is shown in Table 2.

Example 2

The photo-alignment film composition (2) was applied to a PET film of thickness 100 μm using a spin coater, and was then dried at 80° C. for one minute. The dried film thickness at this point was 15 nm.

Subsequently, the light from an ultra high pressure mercury lamp was passed through a wavelength cut filter, a band pass filter and a polarizing filter, and the resulting parallel beam of linear polarized visible-ultraviolet light having a wavelength in the vicinity of 365 nm (irradiation intensity: 20 mW/cm$^2$) was irradiated onto the substrate from a perpendicular direction, thereby yielding a photo-alignment film. The irradiation dose was 1 J/cm$^2$.

The polymerizable liquid crystal composition (LC-2) was applied to the obtained photo-alignment film using a spin coater, and following drying for one minute at 80° C., a uniform optically anisotropic medium was obtained by conducting a heat treatment for 120 minutes at 60° C. under a nitrogen atmosphere. The retardation was 260 nm. The result of inspecting the film state of the obtained optically anisotropic medium was evaluated in accordance with the external appearance criteria. The result is shown in Table 2.

Examples 3 to 12 and Comparative Examples 1 and 3 to 6 were conducted in the same manner as Example 1. Comparative Example 2 was conducted in the same manner as Example 2. The results obtained in each of these Examples are summarized in Table 2.

TABLE 2

| | Composition | Polymerizable liquid crystal composition | External appearance | Adhesion evaluation | Haze |
|---|---|---|---|---|---|
| Example 1 | (1) | LC-1 | A | 56.6 | 0.02 |
| Example 2 | (2) | LC-2 | A | 57.2 | 0.02 |
| Example 3 | (3) | LC-1 | A | 56.5 | 0.02 |
| Example 4 | (4) | LC-1 | A | 26.4 | 0.90 |
| Example 5 | (5) | LC-1 | A | 48.1 | 0.98 |
| Example 6 | (6) | LC-1 | A | 77.2 | 0.34 |
| Example 7 | (7) | LC-1 | A | 75.8 | 0.34 |
| Example 8 | (8) | LC-1 | A | 5.8 | 0.02 |
| Example 9 | (1) | LC-3 | B | 55.8 | 0.02 |
| Example 10 | (6) | LC-3 | A | 74.1 | 0.34 |
| Example 11 | (8) | LC-3 | A | 6.5 | 0.95 |
| Example 12 | (9) | LC-3 | A | 23.5 | 0.83 |
| Comparative Example 1 | (10) | LC-1 | A | 1.2 | 0.25 |
| Comparative Example 2 | (11) | LC-2 | A | 1.5 | 0.27 |
| Comparative Example 3 | (10) | LC-3 | B | 0.7 | 0.25 |
| Comparative Example 4 | (12) | LC-3 | A | 0 | 0.31 |
| Comparative Example 5 | (13) | LC-1 | C | 3 | 9.82 |
| Comparative Example 6 | (14) | LC-1 | A | 1 | 3.78 |

From the results in Table 2, it is evident that the optically anisotropic media obtained in Examples 1 to 12 have no external appearance defects, have a transparent film-like state, and exhibit excellent adhesion. In contrast, although the optically anisotropic media of Comparative Examples 1 to 4 that do not include an added polymer exhibit no external appearance defects, they suffer from inferior adhesion. Further, Comparative Examples 5 and 6 represent examples in which the azo compound and the polymer are not mutually soluble (namely, a haze value of 1 or greater), and these media also suffered from inferior adhesion.

Accordingly, it is clear that the composition for a photo-alignment film according to the present invention yields an optically anisotropic medium that has no external appearance defects and exhibits excellent adhesion to the substrate.

INDUSTRIAL APPLICABILITY

The composition for a photo-alignment film according to the present invention is useful as a structural member for an optically anisotropic medium in which a liquid crystal layer is aligned by light irradiation.

The invention claimed is:

1. A composition for a photo-alignment film, comprising an azo compound of formula (1) by general formula (1) and a polymer that exhibits mutual solubility with the azo compound represented by the general formula (1):

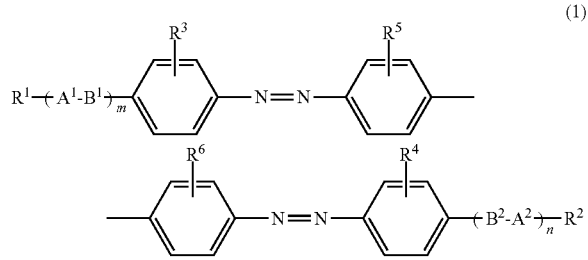

wherein $R^1$ and $R^2$ each independently represents a hydroxyl group or a polymerizable functional group selected from the group consisting of a (meth)acryloyl group, (meth)acryloyloxy group, (meth)acryloylamino group, vinyl group, vinyloxy group and maleimide group, provided that at least one of $R^1$ and $R^2$ represents a polymerizable functional group, $A^1$ and $A^2$ each independently represents a single bond or a divalent hydrocarbon group that may be substituted with an alkoxy group, and $B^1$ and $B^2$ each independently represents a single bond, —O—, —CO—O—, —O—CO—, —CO—NH—, —NH—CO—, —NH—CO—O— or —O—CO—NH—, provided that a —O—O— linkage is not formed in a link to $R^1$ and $R^2$, m and n each independently represents an integer of 0 to 4 wherein, when m or n is 2 or greater, a plurality of $A^1$, $B^1$, $A^2$, and $B^2$ groups may be respectively identical or different, and an $A^1$ or $A^2$ group sandwiched between two $B^1$ groups or $B^2$ groups represents a divalent hydrocarbon group that may be substituted with an alkoxy group, $R^3$ to $R^6$ each independently represents a hydrogen atom, halogen atom, halogenated alkyl group, allyloxy group, cyano group, nitro group, alkyl group, hydroxyalkyl group, alkoxy group, carboxyl group or alkali metal salt thereof, alkoxycarbonyl group, halogenated methoxy group, hydroxyl group, sulfonyloxy group or alkali metal salt thereof, amino group, carbamoyl group, sulfamoyl group, or a polymerizable functional group selected from the group consisting of a (meth)acryloyl group, (meth)acryloyloxy group, (meth)acryloylamino group, vinyl vinyloxy group, and maleimide group, wherein the polymer that exhibits mutual solubility with the azo compound of formula (1) by the general formula (1) is a polymer having a substituent represented by any one of the structure shown below:

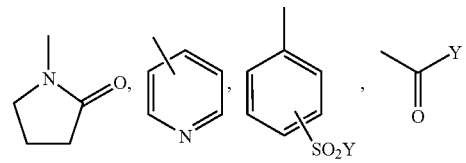

wherein Y represents a hydroxyl group, —ONa, —OK, —OLi, or an amino group.

2. A composition for a photo-alignment film according to claim 1, wherein a weight average molecular weight of the polymer that exhibits mutual solubility with the azo compound represented by the general formula (1) is within a range from 300 to 100,000, and a quantity of the polymer is within a range from 1 to 50% by weight relative to a total weight of the composition for a photo-alignment film.

3. A photo-alignment film which is obtained by forming a layer of a composition for a photo-alignment film according to claim 1 on a substrate and subsequently irradiating the layer with light to generate a liquid crystal alignment ability, wherein a haze of the photo-alignment film is not more than 1.

4. An optically anisotropic medium, wherein a layer (A) obtained by irradiating a layer of a composition for a photo-alignment film according to claim 1 with light to generate a liquid crystal alignment ability, and a polymer layer (B) obtained by polymerizing a liquid crystal compound having a polymerizable group in an aligned state generated by the layer (A) are bonded and laminated together by covalent bonds.

5. An optically anisotropic medium according to claim 4, wherein the layer (A) is a layer in which a liquid crystal alignment ability has been generated in a pattern in two or more different directions.

6. An optically anisotropic medium according to claim 4, wherein the substrate is a plastic substrate.

7. A method of producing an optically anisotropic medium wherein a layer (A) obtained by irradiating a layer of a composition for a photo-alignment film according to claim 1 with light to generate a liquid crystal alignment ability, and a polymer layer (B) obtained by polymerizing a liquid crystal compound having a polymerizable group in an aligned state generated by the layer (A) are bonded and laminated together by covalent bonds, the method comprising:

forming a layer of a composition for a photo-alignment film according to claim 1 on a substrate, subjecting the layer to irradiation with polarized light or irradiation with unpolarized light from a tilted direction, thereby forming the layer (A), laminating a layer comprising a polymerizable liquid crystal compound on top of the layer (A), and then polymerizing the compound represented by the general formula (1) and the polymerizable liquid crystal compound by either light irradiation or heating.

8. A method of producing an optically anisotropic medium according to claim 7, wherein the layer (A) is a layer in which a liquid crystal alignment ability has been generated in a pattern in two or more different directions by performing irradiation with polarized light or irradiation with unpolarized light from a tilted direction through a photomask.

* * * * *